United States Patent
Bouaziz et al.

(10) Patent No.: US 9,349,045 B2
(45) Date of Patent: May 24, 2016

(54) MOTOR VEHICLE HAVING AN INPUT DEVICE FOR HANDWRITING RECOGNITION

(71) Applicant: AUDI AG, Ingolstadt (DE)

(72) Inventors: Tahar Bouaziz, Ingolstadt (DE); Michael Betz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/436,980

(22) PCT Filed: Oct. 2, 2013

(86) PCT No.: PCT/EP2013/002963
§ 371 (c)(1),
(2) Date: Jun. 25, 2015

(87) PCT Pub. No.: WO2014/060069
PCT Pub. Date: Apr. 24, 2014

(65) Prior Publication Data
US 2015/0294145 A1    Oct. 15, 2015

(30) Foreign Application Priority Data
Oct. 19, 2012 (DE) .................. 10 2012 020 608

(51) Int. Cl.
*G06K 9/00* (2006.01)
*G01C 21/36* (2006.01)
(Continued)

(52) U.S. Cl.
CPC ........ *G06K 9/00422* (2013.01); *G01C 21/3611* (2013.01); *G01C 21/3664* (2013.01);
(Continued)

(58) Field of Classification Search
CPC .............. G06F 3/0488; G06F 3/04883; G06F 3/03545; G06F 17/242; G06F 3/041; G06K 9/00402; G06K 9/222; G06K 2209/01; G06K 9/00422; G06K 9/00416; G06K 9/00167; G06K 9/00409
See application file for complete search history.

(56) References Cited

U.S. PATENT DOCUMENTS 7,003,308 B1    2/2006  Fuoss et al.
7,562,314 B2 *  7/2009  Blount ................... G06K 9/222
                                                      345/173
(Continued)

FOREIGN PATENT DOCUMENTS

DE        10349673        5/2005
DE        102005031656    1/2007
(Continued)

OTHER PUBLICATIONS

Akihiro, "Handwritten character input system", Mar. 2012, JP, 2012053844 A, Machine English translation.*
(Continued)

*Primary Examiner* — Edward Park
(74) *Attorney, Agent, or Firm* — Staas & Halsey LLP

(57) ABSTRACT

A method operates an input apparatus for an electronic appliance in a motor vehicle, by having a sensing device sense a character trace from a user while the latter draws the character trace in order to input a character or a group of characters on an input panel of the sensing device. A handwriting recognition device performs character recognition for the sensed character trace, and a display device produces a display for a result of the recognition. To allow comprehensible appliance operation by handwriting recognition in a motor vehicle, the display device also displays the character trace following the performance of the character recognition.

14 Claims, 1 Drawing Sheet

(51) Int. Cl.
*G06F 3/023* (2006.01)
*G06F 3/0488* (2013.01)
*G06K 9/72* (2006.01)

(52) U.S. Cl.
CPC .......... *G06F3/0237* (2013.01); *G06F 3/04883* (2013.01); *G06K 9/00402* (2013.01); *G06K 9/723* (2013.01); *G06K 2209/01* (2013.01)

(56) References Cited

U.S. PATENT DOCUMENTS

| | | | |
|---|---|---|---|
| 2003/0038788 A1* | 2/2003 | Demartines | G06F 3/0485 345/173 |
| 2003/0088410 A1* | 5/2003 | Geidl | G06K 9/72 704/235 |
| 2005/0234722 A1* | 10/2005 | Robinson | G06K 9/222 704/257 |
| 2007/0040813 A1* | 2/2007 | Kushler | G06F 3/0237 345/173 |
| 2007/0070045 A1* | 3/2007 | Sung | G06K 9/222 345/173 |
| 2007/0120830 A1 | 5/2007 | Kaemmerer | |
| 2007/0205625 A1 | 9/2007 | Lai et al. | |
| 2009/0256808 A1 | 10/2009 | Kun et al. | |
| 2012/0072013 A1* | 3/2012 | Hamamura | G06K 9/346 700/224 |
| 2014/0108004 A1* | 4/2014 | Sternby | G06F 17/242 704/9 |

FOREIGN PATENT DOCUMENTS

| | | |
|---|---|---|
| DE | 102012020608.9 | 10/2012 |
| EP | 1475693 | 11/2004 |
| JP | 2006-163830 | 6/2006 |
| JP | 2012-53844 | 3/2012 |
| JP | 2012053844 A * | 3/2012 |
| JP | 2012-68706 | 4/2012 |
| WO | PCT/EP2013/002963 | 10/2013 |

OTHER PUBLICATIONS

German Office Action for German Priority Patent Application No. 10 2012 020 608.9, issued Jul. 22, 2013, 5 pages.
English Language International Search Report for PCT/EP2013/002963, mailed Jan. 1, 2014, 2 pages.
WIPO English Language Translation of the International Preliminary Report on Patentability for PCT/EP2013/002963, mailed Apr. 23, 2015, 9 pages.

* cited by examiner

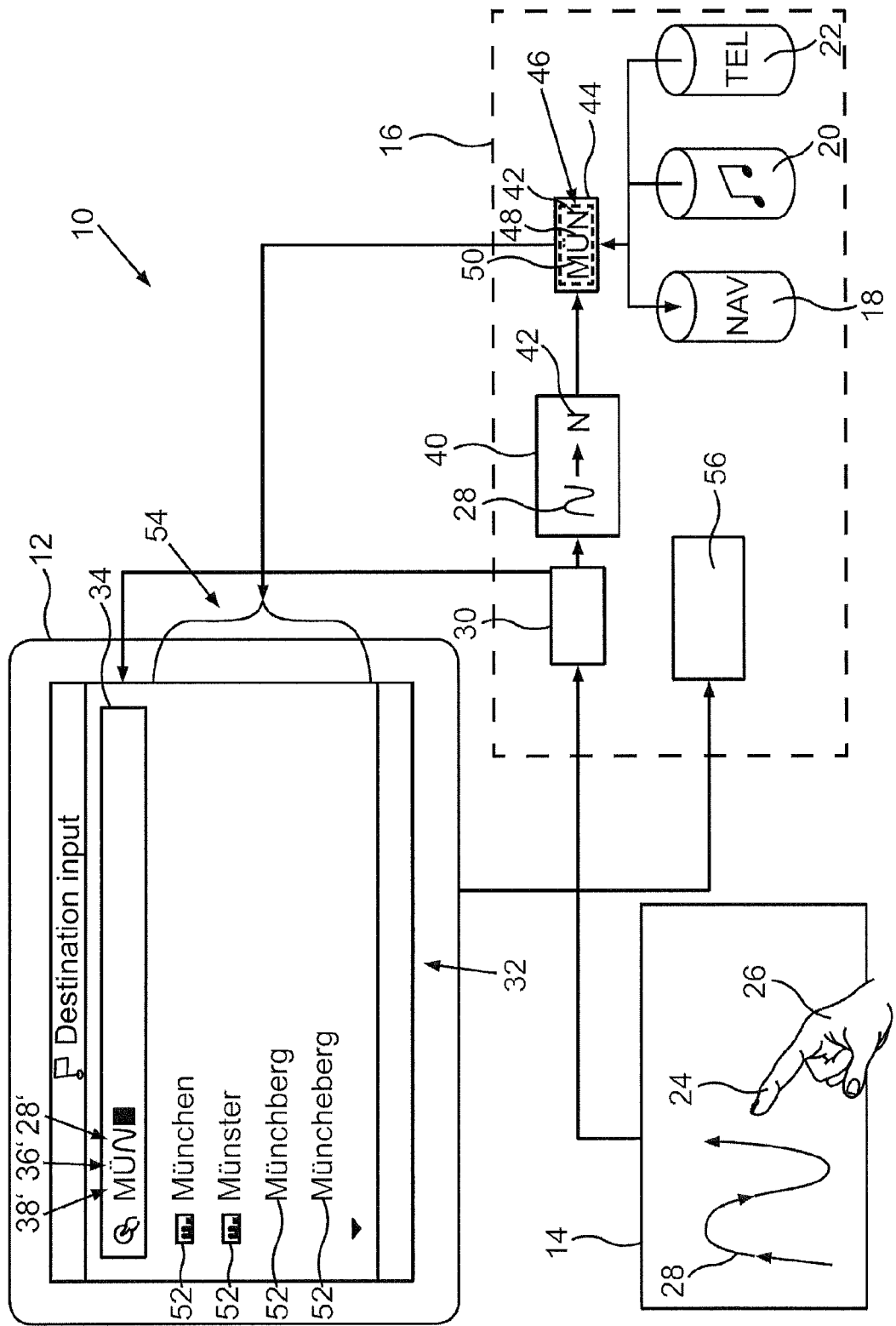

MOTOR VEHICLE HAVING AN INPUT DEVICE FOR HANDWRITING RECOGNITION

CROSS REFERENCE TO RELATED APPLICATIONS

This application is based on and hereby claims priority to International Application No. PCT/EP2013/002963 filed on Oct. 2, 2013 and German Application No. 10 2012 020 608.9 filed on Oct. 19, 2012, the contents of which are hereby incorporated by reference.

BACKGROUND

The invention relates to a motor vehicle having a handwriting recognition system for the operator control of an electronic appliance in the motor vehicle, for example a navigation system or an infotainment system. The invention also includes an input apparatus having a handwriting recognition section and also a method for operating the input apparatus.

An input apparatus can be used to search a navigation database for a place name by drawing letters on an input panel by hand.

Such an input apparatus is known from EP 1 475 693 A2, for example. According to this, the character trace drawn by a user for an individual letter is sensed by a sensing device while the user draws the character trace on the input panel, for example a touch screen. On the basis of the character trace, a handwriting recognition device then performs character recognition and thus recognizes the character that the user intends, that is to say in this case the letter. The character trace displayed on a screen is then replaced by the recognized letter. In this way, the user can input the beginning of a place name in handwriting letter by letter, which place name is then automatically completed where possible on the basis of a database search if the place name can be determined explicitly from the previously input letters.

One problem with the use of handwriting recognition systems is that a character trace cannot always be explicitly associated with a particular character. For example, if the user draws a vertical line "I", this line may mean the uppercase letter I, the lowercase letter l or else the number 1. A handwriting recognition system then outputs as the recognition result the character that matches the character trace to the greatest extent. If the user has written in a scruffy manner and the recognition result is therefore incorrect, the input by the user in the case described above is sometimes automatically augmented to produce a place name that the user did not mean at all. It is then unclear to the user why the input apparatus suddenly displays this incorrect place name.

SUMMARY

One potential object is to allos comprehensible appliance operation by handwriting recognition in a motor vehicle.

The inventors propose a method for operating an input apparatus for an electronic appliance in a motor vehicle, wherein the input apparatus comprises a display device, an input panel and either a controller or a complex comprising a plurality of controllers, wherein the controller or the complex of controllers provides at least one database, an evaluation device, a handwriting recognition section and a search device and wherein:

a sensing device formed by the input panel and the evaluation device senses a character trace from a user while the latter draws the character trace in order to input a character or a group of characters on the input panel of the sensing device, the handwriting recognition device performs character recognition for the sensed character trace, wherein the handwriting recognition device ascertains a plurality of different recognition results for the character trace, and the display device produces a display for a result of the recognition, the at least one database comprises a navigation database and/or a music database and/or an address/telephone number database and the search device uses a database search in the at least one database to search for at least one database entry for each of the different recognition results, which database entry satisfies a match criterion for the recognition result, and the display device displays a hits list formed on the basis of the different recognition results as the result of the recognition, wherein the hits list is formed from database entries that are found, and following the performance of the character recognition the character trace is also displayed together with the display produced for the result of the recognition, so that it becomes clear to the user which of the input characters the handwriting recognition section had difficulties with to the effect that the character trace is ambiguous and therefore a plurality of different recognition results are possible.

On the basis of the method, the actual character trace on the display device is not immediately erased and replaced by the recognized letter. Instead, the original handwriting is initially left to stand. It thus quickly becomes clear to the user which of the input characters the handwriting recognition section had difficulties with to the effect that the character trace is ambiguous and therefore a plurality of different recognition results are possible. The method accordingly provides for a display device, for example a screen, to also display the character trace itself following the performance of the character recognition.

At the same time, ambiguities in the recognition of the character trace are preferably taken into account. On the basis of one development, the method accordingly provides for the recognition device, that is to say a character recognition device for recognizing characters that are input in handwriting, to ascertain for an ambiguous character trace not only that recognition result (that is to say a letter or a number, for example) that has the greatest match with the character trace but also a plurality of different recognition results. Thus, in the example cited above, both the uppercase letter I and the lowercase letter l, the number 1 and possibly also the uppercase letter J are each ascertained as a recognition result for a vertical line "I". The display device is then designed to simultaneously display both the sensed character trace itself and a hits list formed on the basis of the different recognition results.

By way of example, the hits list may directly comprise the respective recognition results. Alternatively, it may comprise the current recognition result together with the previously input characters. The user can thus input a word, e.g. character by character, with ambiguities in the individual character traces meaning that all those letter sequences that can be read for the input character traces are displayed in the hits list each time. By way of example, it would thus be possible for the input of the two character traces for "O" and "I" to result in a hits list having a plurality of list entries, such as: "OI", "01", "ol", "OJ", etc.

In a preferred embodiment of the method, the hits list is not formed directly from the recognition results themselves, however. Instead, a database search in at least one database by a search device is used to search for at least one database entry for each of the different recognition results. In other words, after a new character trace has been recognized, a place name search in a navigation database is thus performed and refined after the input of further characters each time, for example. The hits list is then formed from the database entries found for the different recognition results. For the individual hits, those word components that the system has matched on the basis of the handwriting input, that is to say for which the system has recognized a match, are preferably highlighted in a particular manner in the hits list (e.g. in color or by underlining).

An individual character trace does not have to represent an entire word. The character recognition can be performed as early as after the input of a character trace for an individual character, that is to say a letter, a number or else a special character (e.g. , ; - ! ?), or alternatively of a character trace from a group of characters comprising a plurality of characters in each case. Said group of characters does not need to be a complete word in this case. It is thus possible for the user to draw three characters in succession as a character trace, for example, before the character recognition for said character trace begins. The character trace does not have to be formed of just a single line.

The user can thus input a word or a telephone number, for example, character by character, with the hits list then being altered after the input of each character trace. In other words, the sensing device preferably senses a plurality of character traces in succession, and this prompts character recognition for the current character trace to be performed first of all each time after each of the character traces has been sensed and then the recognition results for all previously sensed character traces to be taken as a basis for defining the database search more precisely, i.e. the number of database entries found is reduced where possible with every further character that is input. Since the database search is defined even more precisely after each character trace has been input, the user advantageously recognizes which character the handwriting recognition system recognizes as ambiguous.

According to one embodiment of the method, the database search is begun each time as soon as a predetermined criterion is satisfied following the sensing of the character trace. By way of example, provision may thus be made for the database search to be begun as soon as the user has lifted a drawing instrument, that is to say a finger or an input stylus, for example, from the input panel. Another suitable criterion states that the character trace must have remained unaltered for a predetermined period of time. The use of a criterion for the beginning of the database search has the advantage that suitable criteria can stipulate when the display produced by the display device is altered. If this happens too early, the user is unsettled when drawing the character trace.

In connection with the proposals, drawing on the input panel does not mean that the user paints a line using a paint. Rather, it is sufficient if the user strokes a finger, for example, over a touch-sensitive input panel of a touchpad, a touch screen or a comparable sensor arrangement that senses the path or trajectory covered by the fingertip, for example, capacitively or optically, for example.

When searching the database, unlike in the related art, it is not absolutely necessary to assume that the input characters form the beginning of a word or of a telephone number, or generally of a database entry. Although the match criterion that is taken as a basis for searching the database may also stipulate such a prefix search, additionally or alternatively an infix search (the previously input character string may also be within a word) and/or a suffix search (the character string describes the end of the word) may also be stipulated. In connection with the method, it has been found that it is no problem to increase the search area in a database by a multiple with infix search and suffix search without confusing a user with a large number of the database entries found. Since the original handwriting continues to be displayed on the display device, it remains possible for the user to tell—even when there are ambiguous character traces—how the information displayed in the hits list has been obtained.

In order to develop a handwriting recognition device, as known per se from the related art, such that it can use the method to ascertain a plurality of different recognition results for an individual character trace, an embodiment of the method provides for the handwriting recognition device to ascertain for each of a plurality of possible recognition results a recognition value that is a measure of a match between the character trace and a respective, possible recognition result. Such a recognition value is an inherently known variable in connection with pattern recognition. By way of example, in the case of handwriting recognition on the basis of hidden Markov models (HMM), it is possible to ascertain a likelihood value or a log likelihood value. On the basis of the related art, the handwriting recognition system then outputs that possible recognition result for which the measure indicates the greatest match as the end result.

The recognition values for a plurality of possible recognition results are then made accessible. It is thus possible to search specifically for those possible recognition results whose recognition value indicates that the match is at least greater than a predetermined minimum. In the case of a character trace for a letter, for example, it is thus not only possible to search for the most similar letter, but rather the two or three most similar letters that have the greatest match with the prescribed character trace can be ascertained as the recognition result. In the examples above, not only the upper-case letter I but also the lower-case letter I and the number 1, for example, would thus be output for a vertical line I if the three most similar recognition results were to be chosen.

As already explained at the outset, the proposal also includes an input apparatus for an electronic appliance in a motor vehicle. Said input apparatus is set up to carry out an embodiment of the method.

The motor vehicle, which has likewise already been cited, is distinguished by an embodiment of the input apparatus that is provided in the motor vehicle. In the motor vehicle, the input apparatus is then preferably designed for the operator control of a navigation appliance and/or an infotainment system and/or a mobile radio system of the motor vehicle. Hence, a user of the motor vehicle can advantageously use the input apparatus to select a place name in a navigation database, for example, a music title in an infotainment system, for example, and a telephone number or the name from an address book in a mobile radio system by handwritten input of at least a part of the search term.

BRIEF DESCRIPTION OF THE DRAWING

These and other objects and advantages of the present invention will become more apparent and more readily appreciated from the following description of the preferred embodiments, taken in conjunction with the accompanying drawing of which:

To this end, the single FIGURE (Fig.) shows an input apparatus 10 that is a preferred embodiment of the proposed input apparatus.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The invention will be explained once again in more detail below with reference to a specific exemplary embodiment.

To this end, the single FIGURE (Fig.) shows an input apparatus 10 that is a preferred embodiment of the input apparatus. By way of example, the input apparatus 10 may be installed in a motor vehicle, particularly an automobile. The input apparatus 10 may comprise a display device 12, for example a screen with an associated electronic controller, an input panel 14, for example a touchpad or a character area based on capacitive or optical sensing, and a controller 16. Instead of the single controller 16 shown in the FIGURE, a complex comprising a plurality of controllers may also be provided. The controller 16 may be part of an infotainment system of the motor vehicle, for example.

In the example on which the FIGURE is based, a user wishes to stipulate a navigation destination for an imminent journey. To this end, he wishes to select a place name for the navigation destination from a navigation database 18. The navigation database 18 may be provided in the controller 16. In this case, the navigation database 18 may be provided together with further databases, for example a music database 20 and/or an address/telephone number database 22. In order to search for the place name, the user strokes a finger 24 of one hand 26 over the input panel 14 and thus draws a character trace 28 on the input panel 14. The sensors in the input panel 14 sense the character trace 28 and transmit corresponding signals to an evaluation device 30 of the controller 16, which evaluates the signals. The evaluation device 30 and the input panel 14 together form a sensing device for the character trace 28.

During the input, a display 32 is produced on the display device 12, said display being able to comprise a handwriting area 34 in which a depiction 28' of the character trace 28 together with depictions 36', 38' of previously sensed character traces in the order of their input can be presented. The data of the current character trace 28 that are produced from the sensor signals from the touch panel 14 by the evaluation device 30 are transmitted not only to the display device 12 but also to a handwriting recognition section 40.

The handwriting recognition section 40 performs handwriting recognition for the current character trace 28 and, in the present example, recognizes the letter "N" in the character trace 28. The letter that has been recognized forms the, in this case explicit, recognition result 42 of the handwriting recognition for the character trace 28. The recognition result 42 is forwarded to a search device 44 for a database search.

The search device 44 is coupled to the databases 18, 20, 22 and designed to find in the databases 18, 20, 22 at least one database entry that has a part that matches a search character string 46 that is formed from the previously recognized characters. In the example shown, the search character string 46 is formed from the current recognition result 42 and also the recognition results 48, 50 recognized for the preceding character traces. In the situation shown in the FIGURE, the letter sequence "MÜN" has already been recognized. In the present example, the database search is configured to search exclusively the navigation database 18. The database search 44 finds a large number of database entries that match the search character string 46, that is to say in this case "MÜM", on the basis of a selected search criterion, in this case a prefix search.

The database entries 52 found are transmitted from the search device 44 to the display device 12. The display device 12 presents the database entries 52 found as a hits list 54. If the sought place name is among the database entries 52 found and displayed in the hits list 54, the user can select the sought place name directly, for example by tapping, so that a control module 56 can configure the navigation appliance of the motor vehicle as appropriate for navigation on the basis of the selected place name. Otherwise, the user can input a further character trace so as thereby to define the database search more precisely.

By way of example, the components shown for the controller 16, that is to say the evaluation device 30, the handwriting recognition section 40, the search device 44 and the control module 56, may be program modules that may be part of an operating program of the controller 16. The handwriting recognition section 40 may be a recognition algorithm that is known per se from the related art. The database search by the search device 44 may likewise be realized by a search algorithm that is known per se.

The example shows how, taking account of the context (in this case a search exclusively in the navigation database 18), it is still possible to produce an intuitively comprehensible display that illustrates to the user how an input device interprets his handwritten input. Simple and faster inputs are possible as a result, since no manual disambiguation by the user is necessary, i.e. the user does not need to pay attention to whether the system has actually recognized the letter that he has input. Automatic disambiguation by the handwriting recognition section 40 is likewise unnecessary. If the user inputs a zero ("0") and the handwriting recognition section 40 then recognizes not only the zero ("0") but also an uppercase letter O, for example, the database search 44 allows the search to be performed both on the basis of a search character string with a 0 and on the basis of a search character string with an uppercase letter O, and the database entries found in this manner can be included in the hits list 46 collectively. The maintained display of the finger trace in this case even after the character recognition has been performed provides the user with clear and explicit feedback for what he has input. The display of the character trace allows the user to understand why, when he draws a vertical line I, a hits list also contains entries with a 1, an uppercase letter I and the uppercase letter J as the result, for example. Audible feedback is also not necessary, which means that this can likewise be dispensed with.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for operating an input apparatus for an electronic appliance in a motor vehicle, the input apparatus comprising a display device, an input panel and at least one controller that provides a database, an evaluation device, a handwriting recognition device and a search device, the method comprising:

receiving a character trace from a user on the input panel while the user draws the character trace in order to input a character or a group of characters on the input panel;

using the evaluation device to sense the character trace received at the input panel, the input panel and the evaluation device together forming a sensing device;

using the handwriting recognition device to perform character recognition for the character trace sensed by the evaluation device, the handwriting recognition device ascertaining a plurality of different recognition results for the character trace;

using a search device to perform a database search in the database, the database being at least one database selected from the group consisting of a navigation database, a music database and an address/telephone number database, the database search searching for at least one database entry that satisfies a match criterion for each of the plurality of different recognition results;

displaying in a first area of the display device a hits list formed based on the plurality of different recognition results, the hits list being formed from the at least one database entry that satisfies the match criterion; and after performing character recognition, displaying in a second area of the display device the character trace sensed by the evaluation device simultaneously together with the hits list displayed in the first area of the display device, so that the user can identify an ambiguous input character for which the handwriting recognition device had difficulty and produced the plurality of different recognition results, wherein data of the character trace sensed by the evaluation device is transmitted to the display device by the evaluation device for displaying the character trace in the second area of the display device, the database search is started as soon as the user has lifted a drawing instrument from the input panel or as soon as the character trace has remained unchanged for a predetermined period of time, first and second character traces are received on the input panel, a display of the first character trace is removed and replaced with a display of the second character trace when, for the second character trace, the user has lifted the drawing instrument from the input panel or the second character trace has remained unchanged for the predetermined period of time, the evaluation device senses in succession a plurality of character traces received on the input panel as the user more precisely specifies an input string, character recognition is performed on each of the character traces after the character trace is sensed, to produce an additional recognition result, and after each additional recognition result, the database search is refined to more precisely search for a matching entry.

2. The method as claimed in claim 1, wherein the match criterion stipulates that at least one of a prefix search, an infix search and a suffix search is performed on the database.

3. The method as claimed in claim 1, wherein the handwriting recognition device ascertains a recognition value for each of a plurality of potential results, for each potential result, the recognition value is a measure of a match between the character trace and the potential result, and the potential results most closely matching the character trace are selected to produce the plurality of different recognition results.

4. The method as claimed in claim 1, wherein the plurality of different recognition results include at least first and second alpha numeric characters that are different from one another, and the hits list includes a first database entry including the first alpha numeric character and includes a second database entry including the second alpha numeric character.

5. The method as claimed in claim 1, wherein the character trace is received by the user stroking a finger on the input panel.

6. The method as claimed in claim 1, wherein the plurality of different recognition results corresponding to a single character from the character trace include at least first and second alpha numeric characters that are different from one another, and the hits list includes a first database entry including the first alpha numeric character and includes a second database entry including the second alpha numeric character.

7. The method as claimed in claim 6, wherein the first database entry is obtained from one of the databases selected from the group consisting of the navigation database, the music database and the address/telephone number database, and the second database entry is obtained from another one of the databases selected from the group consisting of the navigation database, the music database and the address/telephone number database.

8. A method for operating an input apparatus for an electronic appliance in a motor vehicle, the input apparatus comprising a display device, an input panel and at least one controller that provides a database, an evaluation device, a handwriting recognition device and a search device, the method comprising:

receiving a character trace from a user on the input panel while the user draws the character trace in order to input a character or a group of characters on the input panel;

using the evaluation device to sense the character trace received at the input panel, the input panel and the evaluation device together forming a sensing device;

using the handwriting recognition device to perform character recognition for the character trace sensed by the evaluation device, the handwriting recognition device ascertaining a plurality of different recognition results for the character trace;

using a search device to perform a database search in the database, the database being at least one database selected from the group consisting of a navigation database, a music database and an address/telephone number database, the database search searching for at least one database entry that satisfies a match criterion for each of the plurality of different recognition results;

displaying in a first area of the display device a hits list formed based on the plurality of different recognition results, the hits list being formed from the at least one database entry that satisfies the match criterion; and after performing character recognition, displaying in a second area of the display device the character trace sensed by the evaluation device simultaneously together with the hits list displayed in the first area of the display device, so that the user can identify an ambiguous input character for which the handwriting recognition device had difficulty and produced the plurality of different recognition results, wherein data of the character trace sensed by the evaluation device is transmitted to the display device by the evaluation device for displaying the character trace in the second area of the display device, the database search is started as soon as the user has lifted a drawing instrument from the input panel or as soon as the character trace has remained unchanged for a predetermined period of time, first and second character traces are received on the input panel, a display of the first character trace is removed and replaced with a display of the second character trace when, for the second character trace, the user has lifted the drawing instrument from the input panel or the second character trace has remained unchanged for the predetermined period of time, the handwriting recognition device ascertains a recognition value for each of a plurality of potential results, for each potential result, the recognition value is a measure of a match between the character trace and the potential result, and the potential results most closely matching the character trace are selected to produce the plurality of different recognition results.

9. The method as claimed in claim 8, wherein the evaluation device senses in succession a plurality of character traces received on the input panel as the user more precisely specifies an input string, character recognition is performed on each of the character traces after the character trace is sensed, to produce an additional recognition result, and after each additional recognition result, the database search is refined to more precisely search for a matching entry.

10. A method for operating an input apparatus for an electronic appliance in a motor vehicle, the input apparatus comprising a display device, an input panel and at least one controller that provides a database, an evaluation device, a handwriting recognition device and a search device, the method comprising:

receiving a character trace from a user on the input panel while the user draws the character trace in order to input a character or a group of characters on the input panel;

using the evaluation device to sense the character trace received at the input panel, the input panel and the evaluation device together forming a sensing device;

using the handwriting recognition device to perform character recognition for the character trace sensed by the evaluation device, the handwriting recognition device ascertaining a plurality of different recognition results for the character trace;

using a search device to perform a database search in the database, the database being at least one database selected from the group consisting of a navigation database, a music database and an address/telephone number database, the database search searching for at least one database entry that satisfies a match criterion for each of the plurality of different recognition results;

displaying with the display device a hits list formed based on the plurality of different recognition results, the hits list being formed from the at least one database entry that satisfies the match criterion; and after performing character recognition, displaying the character trace sensed by the evaluation device together with the hits list, so that the user can identify an ambiguous input character for which the handwriting recognition device had difficulty and produced the plurality of different recognition results, wherein the handwriting recognition device ascertains a recognition value for each of a plurality of potential results, for each potential result, the recognition value is a measure of a match between the character trace and the potential result, the potential results most closely matching the character trace are selected to produce the plurality of different recognition results, the plurality of different recognition results are identified by determining whether each potential result has a recognition value greater than a predetermined minimum recognition value, first and second character traces are received on the input panel, for the first character trace, a plurality of potential results have respective recognition values greater than the predetermined minimum recognition value, to thereby ascertain the plurality of different recognition results for the first character trace, and for the second character trace, only a single potential result has the recognition value greater than the predetermined minimum recognition value, to thereby ascertain only a single recognition result for the second character trace.

11. An input apparatus for an electronic device in a motor vehicle, the input apparatus comprising:

an input panel to receive a character trace from a user while the user draws the character trace in order to input a character or a group of characters on the input panel;

an evaluation device to sense the character trace received at the input panel, the input panel and the evaluation device together forming a sensing device;

a handwriting recognition device to perform character recognition for the character trace sensed by the evaluation device, the handwriting recognition device ascertaining a plurality of different recognition results for the character trace;

a search device to perform a database search in a database, the database being at least one database selected from the group consisting of a navigation database, a music database and an address/telephone number database, the database, the evaluation device, the handwriting recognition device and the search device being provided by at least one controller, the database search searching for at least one database entry that satisfies a match criterion for each of the plurality of different recognition results; and a display device to:

display in a first area of the display device a hits list formed based on the plurality of different recognition results, the hits list being formed from the at least one database entry that satisfies the match criterion; and display in a second area of the display device the character trace sensed by the evaluation device, the character trace being displayed after performing character recognition, the character trace being displayed on the display device simultaneously together with the hits list, so that the user can identify an ambiguous input character for which the handwriting recognition device had difficulty and produced the plurality of different recognition results, wherein data of the character trace sensed by the evaluation device is transmitted to the display device by the evaluation device for displaying the character trace in the second area of the display device, the database search is started as soon as the user has lifted a drawing instrument from the input panel or as soon as the character trace has remained unchanged for a predetermined period of time, first and second character traces are received on the input panel, a display of the first character trace is removed and replaced with a display of the second character trace when, for the second character trace, the user has lifted the drawing instrument from the input panel or the second character trace has remained unchanged for the predetermined period of time, the evaluation device senses in succession a plurality of character traces received on the input panel as the user more precisely specifies an input string, character recognition is performed on each of the character traces after the character trace is sensed, to produce an additional recognition result, and after each additional recognition result, the database search is refined to more precisely search for a matching entry.

12. A motor vehicle comprising the input apparatus as claimed in claim 11.

13. The motor vehicle as claimed in claim 12, wherein the electronic device is at least one device selected from the group consisting of a navigation appliance, an infotainment system and a mobile radio system, and the electronic device is controlled based on a selected entry from the hits list.

14. A method for operating an input apparatus for an electronic appliance in a motor vehicle, the input apparatus comprising a display device, an input panel and at least one controller that provides a database, an evaluation device, a handwriting recognition device and a search device, the method comprising:

receiving a character trace from a user on the input panel while the user draws the character trace in order to input a character or a group of characters on the input panel;

using the evaluation device to sense the character trace received at the input panel, the input panel and the evaluation device together forming a sensing device;

using the handwriting recognition device to perform character recognition for the character trace sensed by the evaluation device, the handwriting recognition device ascertaining a plurality of different recognition results for the character trace;

using a search device to perform a database search in the database, the database being at least one database selected from the group consisting of a navigation database, a music database and an address/telephone number database, the database search searching for at least one database entry that satisfies a match criterion for each of the plurality of different recognition results;

displaying in a first area of the display device a hits list formed based on the plurality of different recognition results, the hits list being formed from the at least one database entry that satisfies the match criterion; and after performing character recognition, displaying in a second area of the display device the character trace sensed by the evaluation device simultaneously together with the hits list displayed in the first area of the display device, so that the user can identify an ambiguous input character for which the handwriting recognition device had difficulty and produced the plurality of different recognition results, wherein data of the character trace sensed by the evaluation device is transmitted to the display device by the evaluation device for displaying the character trace in the second area of the display device, first and second character traces are received on the input panel, a display of the first character trace on the second area of the display device is removed and replaced with a recognized character and with a display of the second character trace on the second area of the display device when, for the second character trace, the user has lifted a drawing instrument from the input panel or the second character trace has remained unchanged for the predetermined period of time, the plurality of different recognition results corresponding to a single character from the character trace include at least first and second alpha numeric characters that are different from one another, and the hits list includes a first database entry including the first alpha numeric character and includes a second database entry including the second alpha numeric character.

* * * * *